UNITED STATES PATENT OFFICE.

JOS. THOMPSON, OF NORTH WRENTHAM, MASSACHUSETTS.

IMPROVEMENT IN CEMENTS FOR ROOFING PURPOSES.

Specification forming part of Letters Patent No. 21,158, dated August 10, 1858.

*To all whom it may concern:*

Be it known that I, JOSEPH THOMPSON, of North Wrentham, in the county of Norfolk and State of Massachusetts, have invented a new composition of matter to be applied for roofing and other purposes; and I do hereby declare that the following is a full and exact description thereof.

In the process of compounding my invention I make use of silicates of potash, soda, or silicates of the alkaline earths as an addition to tar, rosin-residues, oil-residues, and rosin and other oils, for the purpose of rendering the thickened compound elastic and resistant to extremes of natural heat and cold.

In a patent granted to me for the use of decomposed earthy matter containing soluble silicates, these bodies in a natural state are referred to as possessing valuable qualities. Subsequent practice has proved that any soluble silicate dissolved in water and mixed with tar and oily bodies when heated, or even in a natural temperature, will be decomposed so far as to form a ductile compound with these bodies, which may be rendered plastic by earthy, mineral, or organic matter, and will retain a certain ductility in very cold and remain without flowing in very warm weather. A mixture of tar and pitch with rosin-oil and solution of silicate of alkali forms the cementing material of my improved mastic for roofing.

To enable others skilled in the art to make my improved mastic, I proceed to describe more fully my improvement.

Into a tub provided with an agitator I pour one gallon of a saturated solution of silicate of soda, one gallon of rosin-naphtha or other naphtha, eight gallons of rosin-oil, twenty-four gallons of coal-tar, and ten gallons of water. The agitator being in motion combination ensues, and a uniform mass results at common temperatures; but I sometimes heat this compound. To this I add so much sand or other powdered material as will impart the consistency necessary for laying on a thick coat if for a roof or pavement. After adding less earthy material, I also saturate paper with it, or I add it to the pulp in manufacturing a valuable sheathing.

The water used in this composition dries out and allows the mastic to close its pores and become compact without being liable to soften or become brittle at the extremes of natural temperature.

When I use paper saturated and wish to cause it to adhere, I mix in a kettle, which can be heated, five pounds saturated solution of silicate of soda, forty pounds of residue of palm-oil distillation, ten pounds pitch from rosin-oil, twenty pounds pitch from coal-tar, and five pounds of naphtha. The whole being heated to the boiling-point, sand or any pigment is added to give consistency.

I do not claim any mixture of the various kinds of tar and oils, but adapt such materials to the intended use, being governed in choice by the consideration of price, and confine myself to the modification produced in such mixtures by the use of soluble silicates. I call my solid mixed compound "Thompson's Improved Mastic Roofing," and my fabrics "Thompson's Improved Felt."

Neither do I claim the broad ground of a combination of one or more alkaline or earthy silicates with one or more tarry matters; but What I do claim is—

The composition substantially as hereinbefore described, consisting of an alkaline silicate, oil or oils, coal-tar or pitch of coal-tar, and naphtha, (water being added when necessary,) such being for the purpose or purposes hereinbefore set forth.

JOSEPH THOMPSON.

Witnesses:
FRANK T. WARE,
SAML. WARNER, Jr.